United States Patent [19]

Bible et al.

[11] 4,293,016
[45] Oct. 6, 1981

[54] PNEUMATIC TIRE ASSEMBLY

[75] Inventors: Dennis E. Bible, Stow; Richard N. Crano, Akron; John A. Welch, Cuyahoga Falls, all of Ohio

[73] Assignee: The General Tire & Rubber Co., Akron, Ohio

[21] Appl. No.: 133,178

[22] Filed: Mar. 24, 1980

[51] Int. Cl.$^3$ .............................................. B60C 17/04
[52] U.S. Cl. .............................. 152/158; 152/330 RF; 152/400
[58] Field of Search ................................ 152/151–152, 152/157–158, 330 RF, 306–314, 339–340, 387–391, 400, 401

[56] References Cited

U.S. PATENT DOCUMENTS

| | | | |
|---|---|---|---|
| 2,067,545 | 1/1937 | Ricketts, Jr. | 152/339 |
| 2,224,066 | 12/1940 | Shore | 152/340 |
| 4,045,362 | 8/1977 | Kuan et al. | 252/49.3 X |
| 4,137,960 | 2/1979 | Cataldo | 152/330 RF |
| 4,163,466 | 8/1979 | Watts | 152/158 |
| 4,216,810 | 8/1980 | Osada et al. | 152/389 X |

FOREIGN PATENT DOCUMENTS 54-97902  8/1979  Japan .......................... 152/330 RF

*Primary Examiner*—John E. Kittle
*Assistant Examiner*—Lois E. Boland

[57] ABSTRACT

A pneumatic tire assembly is capable of supporting a vehicle wheel rolling for a limited distance when the air in the assembly has escaped. The tire of the assembly is prevented from going completely flat by an annular insert, preferably of a high modulus elastomeric material, that is placed inside the tire and fits over the wheel rim and between the beads of the tire. The annular insert is of a novel construction that is lightweight and flexible enough to be stretched over a conventional rim, yet is able to support the load normally borne by the inflated tire and also resists unseating of the beads.

3 Claims, 4 Drawing Figures

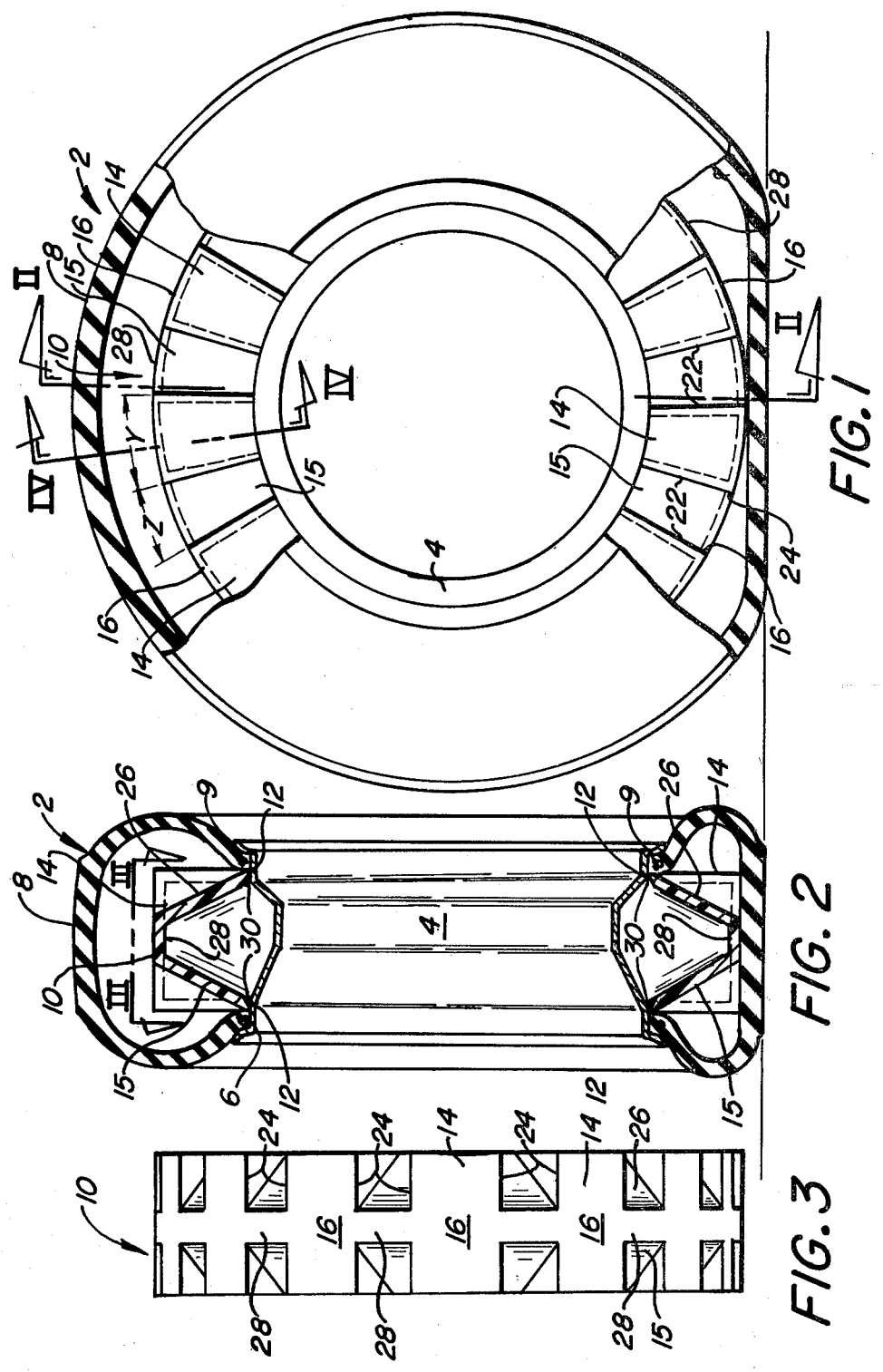

PNEUMATIC TIRE ASSEMBLY

This invention relates to pneumatic tire assemblies, and more particularly to pneumatic tire assemblies that can continue to operate after the pneumatic tire has lost its inflation pressure.

The present invention resides in a novel construction of an annular insert that fits inside the pneumatic tire and over the wheel rim of a pneumatic tire assembly to prevent the tire from going completely flat when the air escapes.

The general idea of providing an insert between the beads of a tire to enable it to run in a "run-flat" condition has been well known for a long time. Previous examples of such inserts are shown in U.S. Pat. Nos. 2,067,545 and 2,224,066. However, a common problem with such inserts, illustrated in these patents, is that in building the insert strong enough to withstand the loads normally taken by the inflated tire and keep the beads of the tire on their seats, the insert becomes too heavy and too inflexible for easy mounting on the wheel rim. For instance, the inserts of both the mentioned patents employ heavy, inflexible metal frames and the insert of U.S. Pat. No. 2,224,066 has in addition a very heavy elastomeric section. Another disadvantage with many inserts is that, due to their rigidity, they cannot be mounted on a standard rim, but require a rim that is divided into sections that must be separated in order to install the insert. The insert of U.S. Pat. No. 2,067,545 is an example of one requiring such a split rim. Still other inserts, such as that of U.S. Pat. No. 2,224,066, require a separate air chamber, sealed from that of the tire, to enable the insert to carry the load when the tire is deflated.

By contrast, the present invention provides a pneumatic tire assembly with an elastomeric insert that can be easily assembled on a conventional wheel rim, yet will support the vehicle loads normally carried by an inflated tire, even when the tire is deflated and is running at speeds of up to 25 miles per hour (40 km./hr.). In addition, the elastomeric insert keeps the beads of the tire in place in their bead seats on the rim and keeps the tire from wobbling laterally during its rotation. The insert is of a lightweight construction, and thus adds little to the vehicle weight; yet, it also stays firmly in place between the beads of the tire and does not cause vibrations due to centrifugal force, even when the vehicle is running at speeds of 55 miles per hour (88 km./hr.) with the tires inflated at normal pressure.

Also, the insert of the present invention is made as a unit separate from the tire, and is mounted so that it does not affect tire characteristics such as tire handling and rolling resistance when the tire is inflated to normal pressure. Furthermore, the insert does not require inflation pressure in order to support the tire when the tire is deflated, and the insert can be mounted on a standard, one-piece wheel rim.

To accomplish the foregoing results, the annular insert of the pneumatic tire assembly has radially inner edges that are mounted on the flanges of the wheel rim and engage the tire beads that are also mounted on these flanges. The insert is divided into spaced apart first sections disposed about its circumference, and each of these first sections has a rectangular radially outward wall substantially concentric with the tread of the pneumatic tire and having two side edges each substantially parallel with one of the above mentioned radially inner edges of the insert. Each of these first sections also has a first pair of sidewalls extending between the mentioned two side edges of the radially outward wall and the radially inner edges of the insert, and a second pair of sidewalls extending radially inwardly from the other two side edges of the rectangular radially outward wall. All of the sidewalls are substantially perpendicular to the radially outward wall. The elastomeric insert further includes a plurality of circumferentially spaced second sections connecting the first sections together, these second sections having lateral walls that extend between the second pairs of walls of the first sections and extend radially outwardly and axially toward each other from the radially inner edges of the insert that engage the beads of the tire.

The foregoing objects and features of the invention will be more readily apparent from the following detailed description of the invention and the attached drawings, in which:

FIG. 1 is a side elevation of a pneumatic tire assembly, with portions thereof broken away, illustrating an embodiment of the present invention;

FIG. 2 is a sectional view of the pneumatic tire assembly of FIG. 1, taken along line II—II of FIG. 1;

FIG. 3 is a view of one part, namely the annular insert of the pneumatic tire assembly of FIG. 1, taken along line III—III of FIG. 2.

Figure 4:
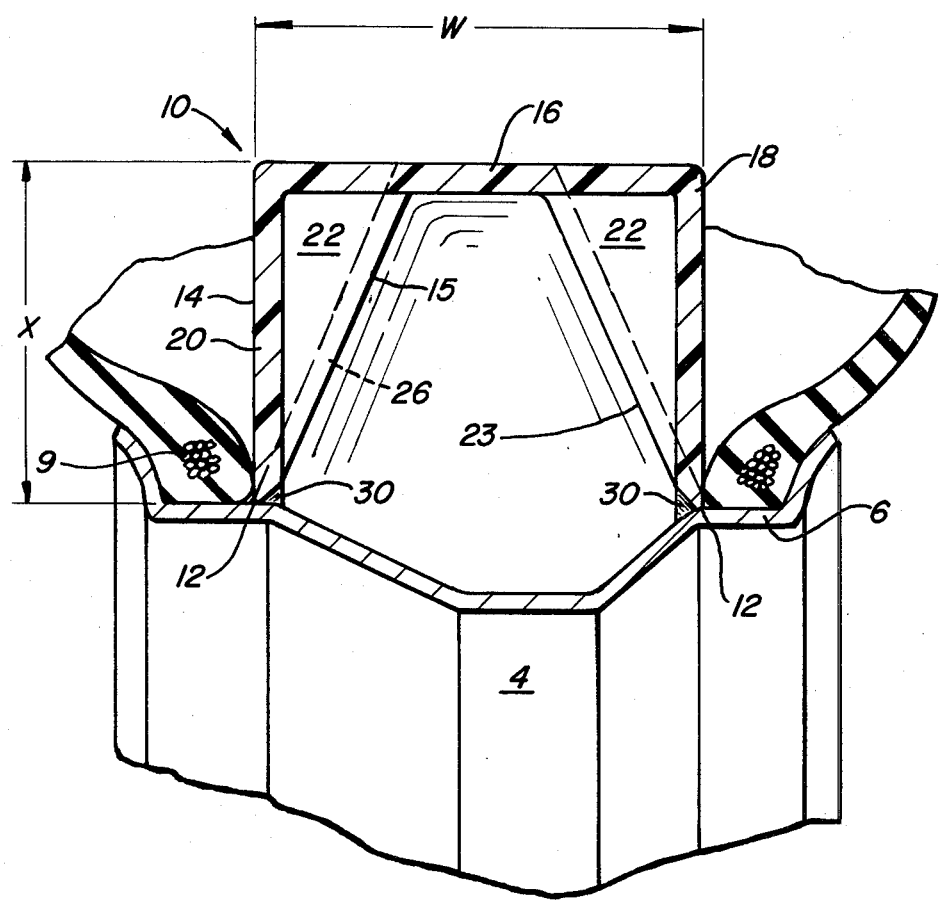
FIG. 4 is another sectional view of the pneumatic tire assembly of FIG. 1, taken along line IV—IV of FIG. 1.

As shown in FIGS. 1 and 2 a pneumatic tire assembly 2 includes a wheel rim 4 with laterally projecting flanges 6, a pneumatic tire 8 with beads 9 seated on the flanges 6, and an annular elastomeric insert 10 extending around the circumference of the rim 4. The tire 8 is shown on its deflated state, as can be seen by the fact that at the point on the circumference where the tire tread meets the ground, the tire 8 is in a partially flattend condition, and the wheel rim 4 is supported essentially by the insert 10.

The elastomeric insert 10 has radially inner edges 12 mounted on the flanges 6 of rim 4 and engaging the tire beads 9. As illustrated in the broken away portions of FIG. 1, the insert 10 is divided into circumferentially alternating sections 14 and 15.

As shown in FIG. 3 and 4, each section 14 has concentric with the tread of the tire 8 a rectangular, radially outward wall 16, with side edges 18 extending parallel to the radially inner edges 12 of the insert. Between the side edges 18 and radially inner edges 12 extend a pair of sidewalls 20. The box-shaped structure of each section 14 is completed by a second pair of sidewalls 22 extending radially inwardly from edges 24 of the outer wall 16. In the present embodiment, each of the sidewalls 22 is divided into two separate sections by the opening 23 (FIG. 4). Each of the sidewalls 20 and 22 are substantially perpendicular to the radially outward wall 16, and these sidewalls are thus positioned to act with compressive resistance of buckling box structures to loads applied to the radially outward wall 16. However, these sidewalls 20 and 22 are made thick enough with respect to their radial height so that they react elastically to the heaviest loads expected of them, never collapsing in their buckling stage. With this construction, the sections 14, in cooperation with the sections 15 described below, impart to the insert 10 the ability to support vehicle loads of the magnitude normally carried by an inflated pneumatic tire 8. The box-shaped form of the sections 14, as shown in FIGS. 1 and 2, also contribute to the insert 10 good lateral stability and resistance to lateral wobbling while the insert is rolling on a deflated tire.

Sections 15 of the insert 10 are of a triangular, or V cross-section, as shown in FIG. 2. Each section 15 has inwardly slanting lateral walls 26 extending between the sidewalls 22 of adjacent sections 14. The walls 26 extend from the lateral edges 12 of the insert radially outwardly and toward each other, and the walls 26 preferably have their radially outward edges joined by a bridging wall 28 (FIG. 2 and 3). The slanted walls 26 react to radial loads by directing part of these loads axially outward against the beads 9 of the tire. The sections 15 thus impart to the insert 10 an outward holding force on the tire beads 9 to keep them seated while the tire 8 is rolling in a deflated condition.

The ability of the lateral edges 12 to hole the tire beads 9 on their flange seats 6 may be improved by providing tapered inner surfaces 30 (FIGS. 2 and 4) that make the radially inner edges 12 narrow where they engage the flanges 6. Preferably, these tapered surfaces are at about a 45° angle to the axis of rotation of the wheel assembly 2. When a load is applied to the radially outward walls 16 and 28, the tapered surfaces 30 insure the inward bending tendency of the walls 20 and 26. This results in each of the edges 12 exerting a laterally outward force against the adjacent bead 9, which keeps the bead on its flange 6.

Preferred materials for the elastomeric insert 10 are polyurethane such as E. I. DuPont Company's Adiprene LW510 or L100, or DuPont's Adiprene LW550 or L167. While the LW550 and L167 materials have the advantage of a higher modulus of elasticity and thus do not deform as easily under vehicle loads, the LW510 and L100 materials have greater flex lives and may be preferable because of their ability to withstand more flexing without cracking.

The L100 and L167 materials consist of toluene diisocyanate, prepolymers of polytetramethylene, and ether glycols. The L100 is a higher molecular weight material than the L167. In preparing the L100 material for curing and molding, 100 parts by weight of the L100 material are mixed with 14 parts by weight of 4,4' methylene-bis-2-chloroaniline (MOCA) and 10 parts by weight dioctyl phthalate. The dioctyl phthalate aids in the processing, increases the flex-life and reduces stiffness, but also reduces ultimate tensile strength. It may or may not be used depending on the properties desired. The mixture is then placed in a mold for 1 to 2 hours at a temperature of about 220° F. (104° C.). After molding, the part (in this case the insert 10) should be allowed to cure further at room temperature for several days prior to use in a tire assembly. The L167 material is prepared and cured in the same way and under the same conditions, except that 21.5 parts of MOCA are used instead of 14 parts.

The L100 and L167 materials, using MOCA as a curative, have the disadvantage of being potentially harmful to workers because of the carcinogenic nature of their vapors prior to curing and molding. The LW550 and LW510 materials do not use MOCA as a curative and are not carcinogenic. The LW510 materials has a higher molecular weight than the LW550 and is prepared by mixing 100 parts by weight of LW510 with 11 parts by weight of methylene dianiline and 10 parts dioctyl phthalate. Again, the dioctyl phthalate may or may not be used depending on the properties desired. This mixture is placed in a mold and cured for about 20 hours at 220° F. (104° C.). After molding, the part (the insert 10) should be allowed to cure further at room temperature for several days prior to use in a tire assembly. The LW550 is prepared and cured in the same way and under the same conditions, except that 14.1 parts by weight of methylene dianiline are used instead of 11 parts.

To reduce friction between the inserts 10 and the inside wall of the tire 8, when the tire is rolling in its deflated condition, it is recommended that the inside wall of the tire 8 be coated with a lubricant. A suitable lubricant is a mixture of 100 parts by weight of a water/ethylene glycol mixture having at least one part of water for every 4 parts of ethylene glycol, 0.05 to 2 parts by weight of a polyethylene oxide, 0.15 to 2 parts by weight polysaccharide, and up to 8 parts by weight cellulose fibers. This lubricant is described and explained more fully in U.S. Pat. No. 4,045,362, assigned to the same assignee as the assignee of this invention.

In testing the present invention, an insert 10 was made having walls 16, 20, 22, 26, and 28 of ⅜ inch thickness (about 9.5 mm.). The tire assembly had a nominal rim diameter of 15 inches (about 380 mm.), and the recommended radial thickness X (FIG. 4) of the insert 10 was 3¾ (about 95 mm.), and the width W of the insert 10 was about 5½ inches, or 140 mm. The recommended length Y (FIG. 1) of each section 14 was 3½ inches (about 89 mm.), and the recommended length Z of each section 15 was 2½ inches (about 63.5 mm.).

With the foregoing dimensions, the insert 10 made of Adiprene LW510 or LW550 polyurethane is inserted into the tire 8 and then can be deformed easily over the flanges 6 of the rim 4. The road tests of tire assemblies having inserts 10 of the foregoing dimensions and made of both the LW510 and LW550 polyurethanes have demonstrated that they will support the vehicle wheel with the tire deflated and hold the beads of the tire mounted on the wheel flanges even during sharp turns at speeds up to 25 miles per hour (40 km./hr.). Furthermore, these inserts exhibit no vibrations due to centrifugal force unseating them when the car is run with the tires inflated at normal pressure at speeds up to 55 miles per hour.

Satisfactory ride distances of 3 to 4 miles have been achieved thus far with the tire assembly 2 having its tire 8 in the deflated state and using at different times an insert 10 made of LW510 polyurethane and an insert 10 made of LW550 polyurethane. Beyond such distances, fatigue cracking occurs in the material of the insert 10 and the ride becomes rough. Prior to such cracking, however, the tire assembly performs as stated above, and it is anticipated that the run-flat distance life of the inserts 10 can be improved by substituting materials that are similar to LW510 and LW550, such as L100 and L167, but have a greater fatigue resistance.

While one embodiment of the present invention has been thus described, other embodiments, modifications, and added features will be apparent to those skilled in the art, while still remaining within the scope of the appended claims.

We claim:

1. A pneumatic tire assembly capable of supporting a vehicle wheel rolling for a limited distance when the air contained in said assembly has escaped, including a wheel rim with flanges forming bead seats on the lateral sides of said rim, a pneumatic tire having bead portions mounted on said bead seats, and an annular elastomeric insert extending around the circumference of said rim inside said pneumatic tire, said insert having radially inner edges mounted on the flanges of the rim and engaging said beads of the said pneumatic tire, said pneumatic tire assembly characterized by said annular insert having (1) a plurality of spaced apart first sections disposed about the circumference of said insert, each of said first sections having a rectangular radially outward wall substantially concentric with the tread of said pneumatic tire and having four side edges, two of said side edges being each substantially parallel with one of said radially inner edges of the insert engaging said beads of said tire, each of said first sections also having a first pair of sidewalls extending between said two side edges of said radially outward wall and said radially inner edges of the insert, and further having a second pair of sidewalls extending radially inwardly from the other two of said four side edges of said rectangular radially outward wall, each of said sidewalls being substantially perpendicular to said radially outward wall, and (2) a plurality of circumferentially spaced second sections connecting said first sections together, said second sections having lateral walls extending between said second pairs of side walls of said first sections and extending radially outwardly and axially toward each other from the radially inner edges of said insert engaging said beads of said tire.

2. A pneumatic tire assembly according to claim 1 characterized further by said insert being of a polyurethane material.

3. A pneumatic tire assembly according to claim 1 characterized further by the walls of both of said sections of said insert having tapered inner side surfaces adjacent to said radially inner edges.

* * * * *